(12) United States Patent
Pop et al.

(10) Patent No.: US 7,637,653 B2
(45) Date of Patent: Dec. 29, 2009

(54) METHOD TO ANALYZE ECONOMICS OF ASSET MANAGEMENT SOLUTIONS FOR NUCLEAR STEAM GENERATORS

(75) Inventors: Mihai G. M. Pop, Lynchburg, VA (US); John Carroll Griffith, Lynchburg, VA (US); Kent Colgan, Lynchburg, VA (US)

(73) Assignee: AREVA NP Inc., Lynchburg, VA (US)

( * ) Notice: Subject to any disclaimer, the term of this patent is extended or adjusted under 35 U.S.C. 154(b) by 101 days.

(21) Appl. No.: 11/472,651

(22) Filed: Jun. 21, 2006

(65) Prior Publication Data

US 2009/0292574 A1 Nov. 26, 2009

(51) Int. Cl.
*G01N 25/00* (2006.01)
(52) U.S. Cl. .................................. 374/7; 705/8; 703/2
(58) Field of Classification Search ............. 705/8; 374/7, 43, 44, 102, 141
See application file for complete search history.

(56) References Cited

U.S. PATENT DOCUMENTS

| | | | | |
|---|---|---|---|---|
| 3,913,378 | A * | 10/1975 | Hausler ............................ | 374/7 |
| 4,383,438 | A * | 5/1983 | Eaton .......................... | 73/61.62 |
| 4,396,300 | A * | 8/1983 | Characklis et al. ............ | 374/43 |
| 6,580,982 | B2 | 6/2003 | Sinex | |
| 6,594,621 | B1 | 7/2003 | Meeker | |
| 6,772,051 | B2 | 8/2004 | Nagafuchi et al. | |
| 6,775,576 | B2 | 8/2004 | Spriggs et al. | |
| 6,871,160 | B2 * | 3/2005 | Jaw ............................. | 702/182 |
| 6,907,320 | B2 | 6/2005 | Nagafuchi et al. | |
| 6,963,786 | B2 | 11/2005 | Ogushi et al. | |
| 6,970,857 | B2 * | 11/2005 | Card et al. ..................... | 706/19 |
| 6,980,891 | B2 | 12/2005 | Nagafuchi et al. | |
| 7,062,343 | B2 | 6/2006 | Ogushi et al. | |
| 7,269,569 | B2 * | 9/2007 | Spira et al. ..................... | 705/7 |
| 2007/0025413 | A1 * | 2/2007 | Hays et al. ..................... | 374/7 |
| 2007/0181082 | A1 | 8/2007 | Barkich | |

FOREIGN PATENT DOCUMENTS

JP 08338895 A * 12/1996

OTHER PUBLICATIONS

Lapa, Celso. "Maximization of a nuclear system availability through maintenance scheduling optimization using a genetic algorithm." Nuclear Engineering and Design. vol. 196 (2000). pp. 219-231.*

(Continued)

*Primary Examiner*—Beth V Boswell
*Assistant Examiner*—Neil R Kardos
(74) *Attorney, Agent, or Firm*—Kenyon & Kenyon LLP

(57) ABSTRACT

A method to determine corrective actions of a nuclear steam generator, having the steps of modeling of steam generator tube and deposit heat transfer characteristics by analytically deriving specific deposit characteristics and descriptive model parameters, wherein the modeling uses historical thermodynamic data for an operating plant under evaluation, identifying a set of one of preventive and corrective maintenance alternatives to accomplish steam generator deposit objectives, determining through the modeling a power production impact of each of the set of one of preventative and corrective maintenance alternatives to determine an economic cost for each of the set of preventative and corrective maintenance alternatives, and initiating a maintenance alternative with a lowest economic cost as compared to the maintenance evaluation alternatives with higher economic costs.

24 Claims, 5 Drawing Sheets

OTHER PUBLICATIONS

Schwarz, T., et al. "Cleanliness Criteria to Improve Steam Generator Performance." International Conference, Nuclear Energy for New Europe 2005. Sep. 5-8, 2005. pp. 174.1-174.10.*

U.S. Appl. No. 60/765,564, filed Feb. 6, 2006, Barkich.

Schwarz et al., 2005, "Cleanliness Criteria to Improve Steam Generator Performance", International Conference, Nuclear Energy for New Europe 1005, Bled, Slovenia, Sep. 5-8, 2005.

* cited by examiner

METHOD TO ANALYZE ECONOMICS OF ASSET MANAGEMENT SOLUTIONS FOR NUCLEAR STEAM GENERATORS

FIELD OF THE INVENTION

The present invention relates to analyzing steam generators for nuclear power plant systems. More specifically, the present invention provides a methodology for evaluation and remediation of nuclear steam generator components.

BACKGROUND INFORMATION

The need to evaluate economic asset management options for nuclear power plants is important with the increased reliance on nuclear power plants for energy production. To aid in evaluating the management options, individual utilities, as well as the nuclear industry in general, have developed extensive databases describing various aspects of steam generator maintenance to allow operators to predict the economic effects of various combinations of degradation mechanisms coupled with different asset maintenance scenarios for those degradation mechanisms. The needs of the nuclear industry, however, clearly indicate that there is no presently available methodology, using collected field data, to allow a credible assessment of asset management scenario options for maintaining the steam generators of existing nuclear power plant stations.

The nuclear industry has operated for a number of years with predictive tools that have been continuously improved, these improvements benefiting from larger defect database populations and better mathematical tools. These tools have been the initial elements in any economical evaluations of nuclear steam generator corrective action alternatives.

With increasing knowledge of the types and processes for deposition of materials as determined from mass balance equations during successive cycles of steam generator operation, the prediction of deposition and the effects of such deposition has been continuously improved. With the expansion of various investigative techniques used in monitoring and assuring steam generator readiness for service, the number of databases and the complexity of data available for evaluation has increased tremendously, making any attempt to accurately provide steam generator asset management an expensive and time consuming exercise. The aggregation of the large number of available parameters pertaining to steam generator status and the selection of the most significant or useful parameters to evaluate has increased the difficulty of efficiently producing a credible economic analysis of steam generator asset management options.

In addition to maintaining the growing databases needed, there is a continuous effort to maintain a level of quality of the descriptive indicators pertaining to steam generator tubing features.

Currently, there is a conventional methodology to assess the cleanliness condition of a steam generator. This conventional methodology brings together operational and inspection data, such as thermal performance and water chemistry data. The cleanliness condition of the tubes of the steam generator is quantified in terms of a "fouling index". The "fouling index" allows for the monitoring of the condition of a specific steam generator, comparing it to other steam generators in the same plant or with steam generators in other plants of a like design. The "fouling factor" also serves as a criterion for selecting future asset management measures such as chemical cleaning.

The first step of this conventional methodology is to select a number of variables for evaluation. The variables used are provided Table 1. Data is then collected during a nuclear refueling outage (e.g. the height of the sludge on steam generator tubesheet is measured), or during the cycle before an outage (e.g. chemistry data) for each of the variables. In the next step of the conventional methodology, weighting factors are applied to each of the five variables; heat transfer performance, water chemistry parameters, sludge on tubesheet, last tubesheet sludge lancing, and tube scale measurements. Note that each of these major variables has a number of variables of interest from which the major indicator is developed. The sum of all weighting factors is 100% for the nuclear steam generator. Within each main category, however, the indicator variables are individually weighted.

TABLE 1

Weighting of Fouling Indicators

| i | Indicator Variables | Weighting Factors |
|---|---|---|
|  | Heat transfer performance | 30% |
| 1 | Fouling factor | ... |
| 2 | Heat transfer margins | ... |
| 3 | Growth rate | ... |
| ... | ... | ... |
|  | Water chemistry parameters | 30% |
|  | $N_2H_4$-ratio | ... |
|  | Fe inventoiy | ... |
|  | Hide-out behaviour | ... |
|  | Hide-out-return behaviour | ... |
|  | ... | ... |
|  | Sludge on tube sheet | 15% |
|  | Number of tubes affected | ... |
|  | Height of sludge | ... |
|  | Colours of tube scale | ... |
|  | ... | ... |
|  | Last TS lancing | 15% |
|  | Quantity removed | ... |
|  | Density of sludge | ... |
|  | Composition of sludge | ... |
|  | ... | ... |
|  | Tube scale measurements | 10% |
|  | Scale thickness | ... |
|  | Appearance, colours | ... |
| n | ... | ... |
|  |  | 100% Sum |

An overall "fouling index" of the steam generator is obtained from the sum of the weighted individual indicator variables This "fouling index", as per the above definitions, is between 0 and 100, where 0 stands for "clean" and 100 stands for "fouled."

According to the conventional methodology, three zones are defined for the fouling index and for the actions to be taken in each zone [1]:

"Green", index 0 to 50: No cleaning actions are required.

"Orange", index 50 to 80: An optimization of the chemistry program should be considered (corrosion product control, oxygen control etc.) and cleaning measures should be planned in the long term.

"Red", index 80 to 100: cleaning actions should be initiated as soon as possible. Cleaning actions are defined here as mechanical tubesheet lancing with high pressure water jets, bundle deluge flushing or chemical cleaning of the whole tube bundle.

This conventional methodology selects, as a synthetic indicator, a value obtained from combining a number of databases using for each one an "experience based" weighting factor.

To establish confidence in the "fouling index", researchers need to acquire empirical data to provide a basis for discerning between various results. Without this data, the index is not a meaningful basis for conducting decisions on spending economic resources to remedy identified problems.

To accomplish this evaluative process accurately, the "fouling index" for many plants, for various points in time, must be calculated. For each of the plants, researchers need to correlate operating experiences (measured in terms of operating and maintenance cost, or onset of corrosion, or power loss, etc.) with the index. Assuming there is a correlation, the index would then be meaningful.

There are several defects with this type of methodology for evaluation of steam generator assets and the methodologies to be used to protect those assets. First, the conventional methodology is not clear as to what basis is used to change the weighting factors or fouling index action levels. For example, it is unknown what type of fouling index would trigger use of the techniques for cleaning and how such cleaning techniques would renormalize other indices.

It is also not clear how variables, such as the measurable variables (see Table 1), for the last tubesheet lancing indicator are aggregated to obtain the values for that process. The current methodologies do not account for introducing another measured characteristic variable, such as the proportion of the tubesheet cleaned during sludge lancing and if so, how would these variables be combined for the overall last tubesheet lancing indicator variable.

The conventional methodology does not disclose or suggest the capability of replacing any variables with "equivalent variables". For example, it could be desirable to use final feedwater oxygen flow in evaluative calculations instead of a hydrazine ratio. Additionally, the conventional methodology does not discuss using a net deposit inventory for any evaluative purposes.

The conventional methodology does not account for pressure margin reduction or power loss variables, significantly impacting evaluative analysis. The conventional methodology is also too rigid. Introduction of new measurements or elimination of variables that have no reliable history are not addressed. There is no provision for renormalization of the measurement weighting factors required to maintain the validity of the required action trigger levels.

There is therefore a need to provide a methodology to account for pressure margin reduction or power loss variables to allow proper analysis of nuclear steam generator condition and corrective action alternatives.

There is also a need to provide a methodology that will allow for renormalization of measurement weighting factors to maintain the validity of required corrective action trigger levels for nuclear steam generators.

There is also a need to provide a methodology that will allow the introduction of other measured characteristic variables for evaluation, rather than having a static set of evaluation parameters.

SUMMARY OF THE INVENTION

It is therefore an objective of the present invention to provide a methodology to account for pressure margin reduction or power loss variables to allow proper analysis of nuclear steam generator condition and corrective action alternatives.

It is also an objective of the present invention to provide a methodology that does not rely on arbitrary weighting factors to maintain the validity of corrective action trigger levels.

It is a further objective of the present invention to provide a methodology that will allow the introduction of other measured or derived characteristic variables for evaluation, rather than having a static set of evaluation parameters.

The objectives of the present invention are achieved as illustrated and described. The present invention provides a method to determine corrective actions for nuclear steam generators, by modeling the heat transfer behavior of deposits on the heating surface of the nuclear steam generator, choosing a set of maintenance alternatives for the steam generator, using the model parameters to predict future power production levels under the various maintenance alternatives, calculating one or more of a net present worth, internal rate of return and a payback period of the set of maintenance alternatives, and initiating the maintenance alternative with a lowest economic cost as compared to the maintenance alternatives with higher economic costs based upon the one or more of the net present worth, internal rate of return and payback period. The model parameters, including the B-base fouling factor, describing the heat transfer of said deposits may be derived analytically through an analysis of nuclear plant thermodynamic parameters and secondary side deposit inventory mass. The confidence level associated with the derived parameters may be increased by removing one or more deposit samples from a heating surface of the nuclear steam generator, determining one or more of a thermal resistance of the deposit, thickness of the deposit, a porosity of the deposit, and a tortuosity of a steam channel in a deposit layer on the heating surface.

The present invention provides a method to determine corrective actions of a nuclear steam generator, comprising, modeling of steam generator tube and deposit heat transfer characteristics by analytically deriving specific deposit characteristics and descriptive model parameters, wherein the modeling uses historical thermodynamic data for an operating plant under evaluation; identifying a set of one of preventive and corrective maintenance alternatives to accomplish steam generator deposit objectives; determining through the modeling a power production impact of each of the set of one of preventative and corrective maintenance alternatives to determine an economic cost for each of the set of preventative and corrective maintenance alternatives; and initiating a maintenance alternative with a lowest economic cost as compared to the maintenance evaluation alternatives with higher economic costs.

The method may be accomplished such that the economic cost is based upon one of the net present worth, internal rate of return and a payback period.

Additionally, the method may be accomplished such that the specific deposit characteristics are determined through one of determining at least one of a thickness, a porosity and a tortuosity of a steam channel of a deposit on a heating surface.

The historical thermodynamic data may be steam pressure in the nuclear steam generator under operating conditions; primary system hot and cold leg temperatures, inservice heat transfer tube surface area and steam generator thermal power.

Additionally, the method may be performed such that the method provides that the specific deposit characteristics are obtained through removal of a deposit from the steam generator.

The method may be performed such that the step of determining an economic cost for each of the set of preventative and corrective maintenance alternatives comprises calculat-

DETAILED DESCRIPTION

Figure 1:
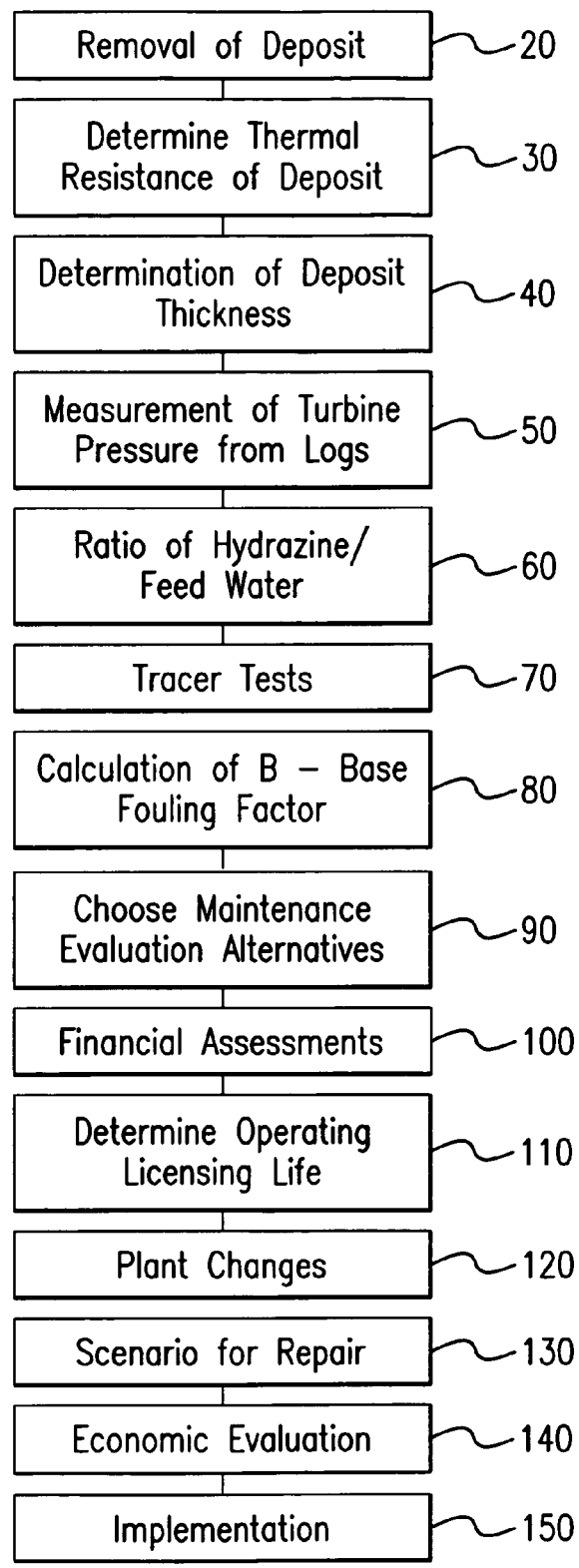
FIG. 1 is a methodology according to the present invention to manage a steam generator in a nuclear power plant.

Referring to FIG. 1, a methodology 10 for determining nuclear steam generator asset management and corrective action is provided. The methodology 10 evaluates identified parameters of a steam generator that are related through their time dependence on evolution of the secondary side deposition on steam generator tubing.

In accordance with the methodology, the thermal resistance of deposited material 30 is determined through analytical evaluation of nuclear plant thermodynamic data via the deposit heat transfer model described herein and, optionally, actual removal and testing of deposits from the surface of steam generator tubing. The removal of the deposit 20 is accomplished through scraping and/or lancing the heating surface of the steam generator tubing. Determination of one or more of the thermal resistance of the deposit, the porosity of the deposit, the chemical composition of the deposit, the thickness of the deposit, and/or the tortuosity of the deposit may be accomplished. In the illustrated exemplary embodiment, a chemical analysis of the flakes obtained from the steam generator tubing is accomplished to determine the thermal resistance.

From operating logs and/or plant electronic data acquisition systems 50, as a minimum the steam pressure, steam generator thermal power, primary side hot leg and cold leg temperatures, and steam pressure at which the turbine valves are fully open are obtained for the nuclear system. Additionally from operating logs, for optional consideration in the evaluation, the ratio of hydrazine concentration in the steam generator is determined and compared to the hydrazine concentration in feed water 60; and the hideout return of chemical impurities from deposit crevices is determined via evaluation during down power events 70.

In conjunction with the parameters measured above, a B-base fouling factor 80 is defined and calculated to describe the evolution in time for all of the heat transfer model parameters to assess steam generator condition and corrective action alternatives. The B-base fouling factor itself may be time dependent and may be calculated during different times in the operating cycle. As all the above parameters have a specific behavior in time in the absence of significant chemistry or system configuration changes, the B-base fouling factor provides a significant improvement of analysis capability over conventional systems that merely evaluate a current tube status.

Figure 2:
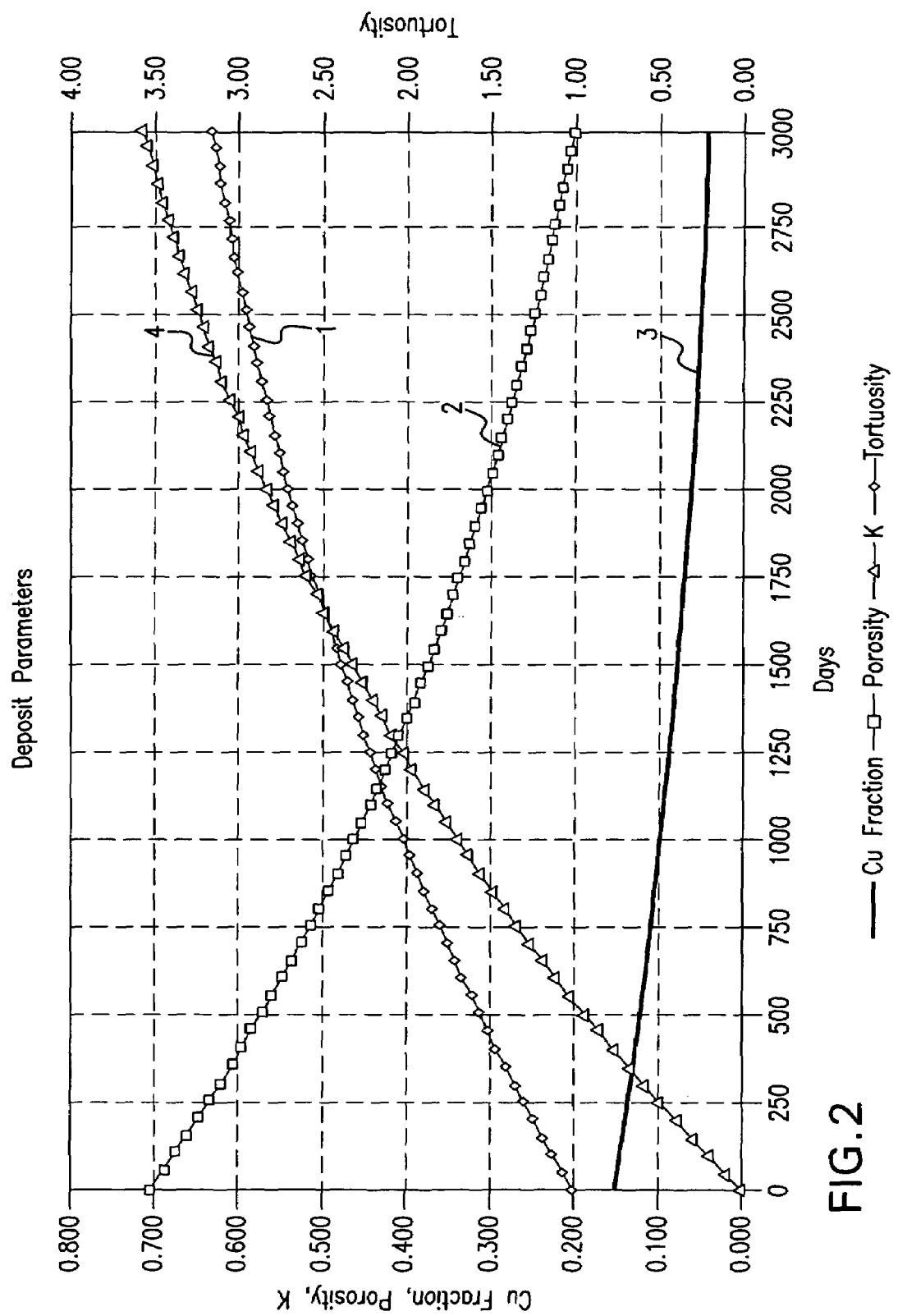
FIG. 2 is a graph of deposit characteristics, over time, for a nuclear steam generator.

In an exemplary embodiment provided in FIG. 2, the evolution, over time, of deposit porosity, tortuosity, K parameter (the effective fraction of full thickness conductive heat transfer resistance which lies between the tube OD and the steam channels), and copper content for the same B value (calculated for a given plant as 2400 days for example) is presented to illustrate the changes that occur. As presented in FIG. 2, the top line 1 represents tortuosity of the path for the escape of steam from the deposit steam channels. Line 2 presents the porosity of the material present on the heating surface. Line 3 presents the copper fraction of the materials deposited on the heating surface. Line 4 presents the K parameter. As provided in FIG. 2, the K parameter and tortuosity of the deposited material increases over time. The porosity, however, decreases over time, indicating an increasingly dense structure over the period of evaluation. The tortuosity is defined as the amount of length of the path through a steam chimney in the deposit divided by the overall thickness of the deposit.

The above values may be obtained from a reduced number of measured deposit thickness, porosity, copper content, heat transfer resistance and/or tortuosity values fitted to the formulas below; or derived analytically from the model using the equations below, deposit inventory mass, and operating plant thermodynamic data; or through a combination of both approaches. Individual model parameters evolve as a function of the B parameter as follows:

$$\varepsilon = \varepsilon_o e^{\left(\frac{-t}{B}\right)}$$

Porosity $$\tau = 1 + \tau_o\left(1 - e^{\left(\frac{-t}{B}\right)}\right)$$

Steam channel tortuosity as a fraction of the entire deposit thickness $$K = K_o\left(1 - e^{\left(\frac{-t}{B}\right)}\right)$$

Effective fraction of resistance D which lies between the tube OD and the steam channels $$Cu = Cu_o e^{\left(\frac{-t}{B}\right)}$$

deposit copper content $$\delta = \frac{M_I}{(1-\varepsilon)(SD)(A_T)}$$

Locally or uniformly distributed deposit thickness
  $M_I$=mass of deposit inventory
  SD=solid density of deposit
  $A_T$=tube bundle outside diameter surface area affected by deposition
  t=the number of days since startup of the reactor or since the occurrence of a significant operational or maintenance event B=time constant describing parameter evolution $\epsilon_o$=a theoretical coefficient value that is chosen through evaluation of like systems which describes the maximum porosity possible. Values are typically selected between 0.05-1 [dimensionless]. The range of values utilized in the model may be further constrained by any available physical deposit measurements.

$\tau_o$=a coefficient which relates to the maximum tortuosity possible. Values are typically selected between 1-10 [dimensionless]. The range of values utilized in the model may be further constrained by any available physical deposit measurements.

$K_o$=a coefficient describing the maximum K value possible. Values are constrained to the range 0.0 to 1.0. The range of values utilized in the model may be further constrained by any available physical deposit measurements.

$Cu_o$=a coefficient describing the maximum copper content value possible. Values are typically constrained to the range 0.0 to 0.5. The range of values utilized in the model may be further constrained by any available physical deposit measurements.

The B parameter is calculated from empirical deposit measurement data and the corresponding equation above. As with the other deposit parameters, the B parameter may also be derived from the heat transfer model coupled with historical thermodynamic data and deposit inventory mass data for the operating plant under evaluation.

Figure 3:
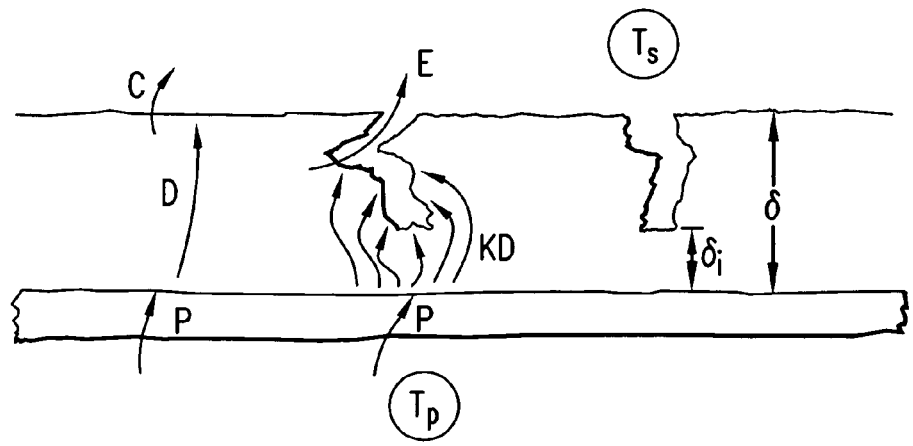
FIG. 3 is a simplified deposit model for a nuclear steam generator surface.

Referring to FIG. 3, a simplified deposit model is provided as a basis for evaluative calculations of steam generator tube heat transfer. The simplified deposit model, as illustrated in FIG. 3, employs specific thermodynamic data to estimate the overall heat transfer resistance at various points of time, and modifies the various deposit parameters described above to arrive at the combination of parameter values which best describe the historical heat transfer behavior of the fouled steam generator tubes. Any parameter constraints that may be imposed based on physical measurements of the deposits in question improve the level of confidence in the derived deposit parameter values.

To aid in this evaluative calculation, the following parameters are defined:

$T_{PRIMARY}$=temperature of primary coolant within the SG tube $T_{SECONDARY}$=SG secondary side saturation temperature P=combined heat transfer resistance associated with primary side convection and tube conduction. Assumes negligible change in primary side convection during operation; therefore, P is constant for a given plant.

C=heat transfer resistance associated with secondary side convection in the unfouled state. C is assumed to be constant for a given plant. C is also used to describe the convective resistance of the deposit OD in the fouled condition.

Figure 4:
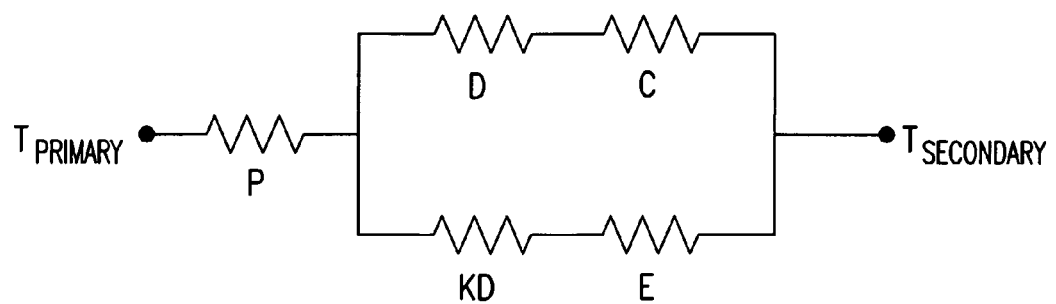
FIG. 4 is a simplified heat transfer model for a deposit using equivalent electrical components

D=heat transfer resistance associated with conduction within the full thickness of the deposit matrix, calculated deterministically based upon deposit characteristics E=heat transfer resistance associated with evaporative heat transfer at the deposit steam channel wall, calculated deterministically based upon deposit characteristics KD=heat transfer resistance between the tube outer diameter and the chimney resulting from the conductivity of the deposit matrix. KD is presented as a fraction of the resistance associated with the entire thickness and models situations wherein, through clogging the bottom of steam chimneys, the chimney does not contact the outer diameter of the heating tube.

$$K > \delta_i/\delta \quad (4)$$

where:

$\delta_i$=the thickness of the "inner layer" of the deposit $\delta$=the thickness of the deposit in its entirety Referring to FIG. 4, the "electrical equivalent" of the model of FIG. 3 is presented. In the model, $T_{PRIMARY}$ is equivalent to the primary side temperature, while $T_{SECONDARY}$ is equivalent to the secondary side (saturation) temperature; and the deposit outer diameter surface area is approximately equal to the clean tube outside diameter surface area. The electrical equivalent of the heat transfer model is used to determine values for R, the overall heat transfer resistance at any point during the operating history of the plant.

In the clean state, E=∞ and D=0, therefore the total heat transfer resistance is $$R_i = P + C \quad (2)$$

$R_i$ is a known quantity for a given plant. If not identified in design documentation, it can be calculated from initial operating data.

In the fouled state, E<∞ and D>0, therefore the total heat transfer resistance is $$R_f = P' + [(E+KD)*(D+C')]/[(E+KD)+(D+C')] \quad (3)$$

$C' = C(A_{CLEAN}/A_{FOULED})$ $P' = P(A_{CLEAN}/A_{FOULED})$ $A_{CLEAN}$=tube surface area in service in clean state $A_{FOULED}$=tube surface area in service in fouled state $R_f$ is known through calculation based on plant thermodynamic data at any point in time for which the required thermodynamic data is available (as a minimum, SG thermal power, hot and cold leg primary side temperatures, steam pressure, and available SG tube heat transfer surface area). D and E are calculated deterministically using industry-accepted relationships.

A close examination of equations 2 and 3 reveals that for any point in time for which the required thermodynamic data is available, and for which deposit parameters have been approximated, the only remaining unknown variables are P and C. Equations 2 and 3 (equation 2 describes the clean state, equation 3 describes the fouled state at one particular point in time), are used to solve for P and C. If data is available for many points in time, many fouled data points are available; hence many estimates of P and C can be developed. This collection of P and C estimates must fit certain constraints: they must be constant in time, and the variability among all the estimates must be minimized. In addition, the overall heat transfer resistance estimated by the resulting model parameters must fit reasonably well the resistance values calculated from the thermodynamic data. The calculational process iteratively converges upon the deposit parameters most appropriate for the constraints applied and produces a set of parameters which may then be used to estimate future heat transfer behavior.

In an exemplary embodiment of the present invention, B values range from 1,000 to 12,000 days.

Figure 5:
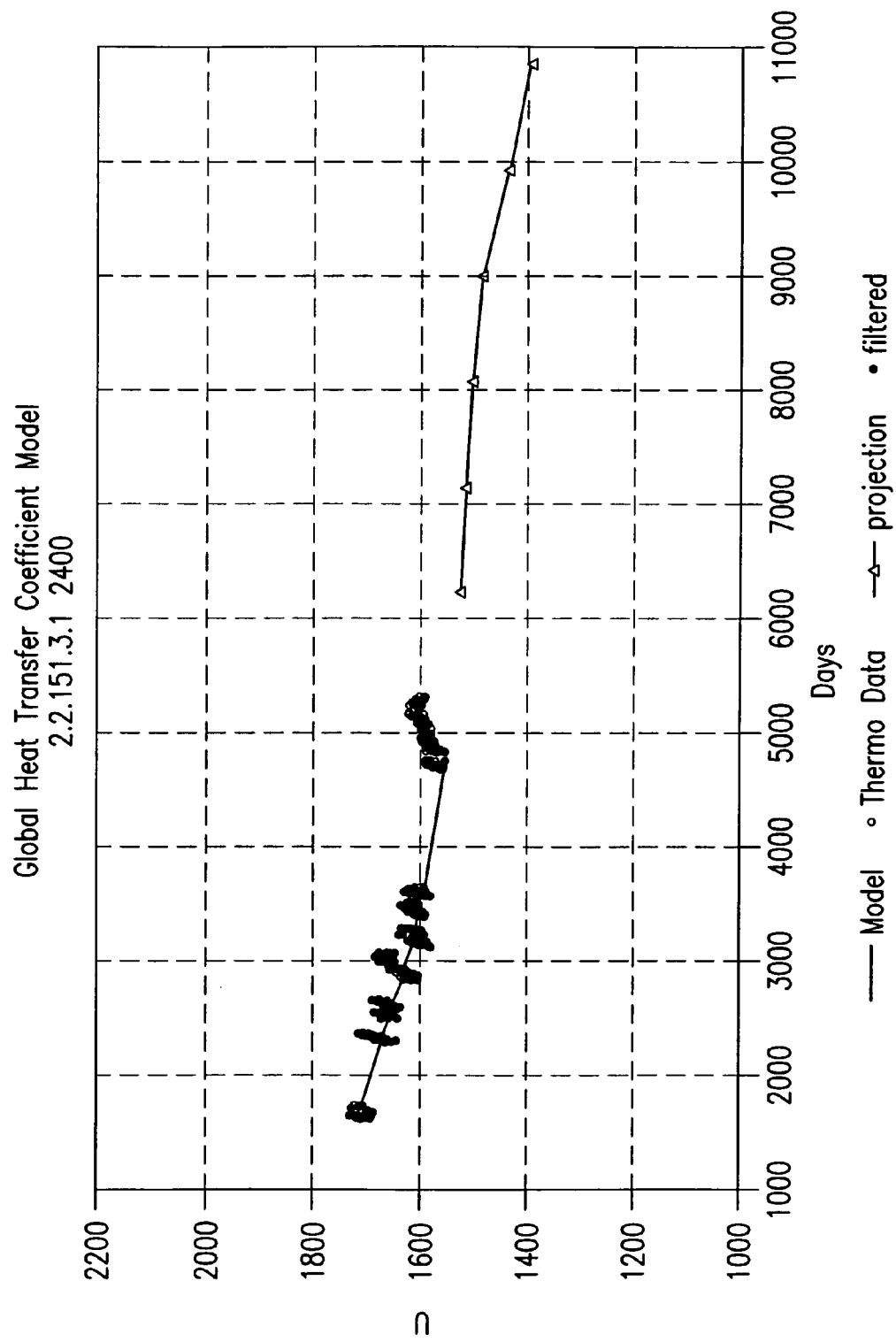
FIG. 5 is an example of global heat transfer coefficient values resulting from the heat transfer model described herein for a nuclear power plant.

A comparison of modeled-generated heat transfer coefficient values and those generated from plant thermodynamic data is given as an example for a given plant in FIG. 5.

Deposits affect steam generator operation on multiple levels such as heat transfer efficiency, thermal hydraulic performance and stability. These deposits also interfere with non destructive examination (NDE) detection performance and are also an initiator for accelerated tube degradation. The measurements of deposition within the steam generator tube bundle and the assignment of a performance impact significance level have been very difficult using conventional methods.

The present invention provides for modeling the deposit condition within the steam generator, and assigning a meaningful significance relative to the overall steam generator operation. The present invention is flexible enough to handle data sets that vary widely in the type and consistency of the available measurements.

According to the methodology of the present invention, the asset management of a steam generator for a given plant consists of assessing the plants deposit management program and identifying the lowest total cost deposit management strategy.

An evaluation of the deposit condition and its relative impact on steam generator operational efficiency is performed to optimize the application of maintenance actions such as chemical cleaning, Upper Bundle Flush (UBF), Enhanced Upper Bundle Flush (EUBF), Sludge Lancing (SL) or other corrective actions.

Referring to FIG. 1, the methodology identifies key design data that relates to steam generator tube corrosion susceptibility (as provided in the step of determining the thermal resistance of the deposit that entails determination of the tube material, tube expansion type, and also measurement of system operating parameters such as operating temperature and operation time as well as those that relate to power output, such as design pressures/temperatures, primary side control temperature and tube surface area).

Financial assessments are then performed 100 to determine replacement power costs once a reactor is placed in a depowered state or operating at reduced power levels due to tube deposit accumulation. The financial assessments also consider escalation rates and cost of capital for such activities.

Next, the remaining licensing life of the reactor/facility is determined through reviewing the operating licensing 110. Planned plant changes 120 from maintenance outages/modifications that may affect corrosion susceptibility, such as for water chemistry, overall power output and thermodynamic margin are also evaluated.

The historical and current deposit inventory is determined based on a review of CPT data, removal history, SSI and/or deposit profiling analysis.

Hideout return evaluations are either performed or reviewed to determine crevice conditions and extent of crevices present. Sludge analyses are reviewed and assessed for aggressive impurities. Historical tube inspections are further reviewed to ascertain the types of degradation mechanisms which occurred and the extent of tube repairs performed. As discussed previously, thermodynamic data is then obtained for the plant.

Different corrective action scenarios for the nuclear steam generator are then to be evaluated 130. As an example, a scenario may include performing an Enhanced Upper Bundle Flush/Sludge Lancing every other outage, IBL every 4$^{th}$ outage, and full DMT every 6$^{th}$ outage.

Using the deposit heat transfer model described herein and the resulting net electrical power projections, coupled with estimates of tube degradation, nuclear power plant outages, and other pertinent costs and benefits for the different corrective action scenarios; the net present value and other economic measures are developed for each scenario within the deposit management plan. The modeled thermal resistance of the deposit layer is a key element of these evaluations and is periodically recalculated to account for planned maintenance activities or unanticipated changes in plant operating behavior.

A base scenario is chosen as a reference for judging the efficacy of the other options 140. This base case is compared in terms of payback period, IRR and/or net present value to each of the alternative scenarios developed to identify the most attractive deposit management action.

Finally, the most attractive economic alternative is implemented 150 and the steam generator is remediated according to the alternative selected.

In exemplary embodiment, different alternatives are calculated where different management strategies are attempted. In comparing the alternatives available for deposit management strategy at a given plant, a first option may be chosen where, for example, only tube repairs are implemented with no preventive or corrective measures implemented to affect active deposit management (the reactive case in FIG. 6). There is also a hyper pro-active option where excessive maintenance is performed to protect the steam generator asset, resulting in an amortization of the cumulative costs of the management program late into the asset life.

Figure 6:
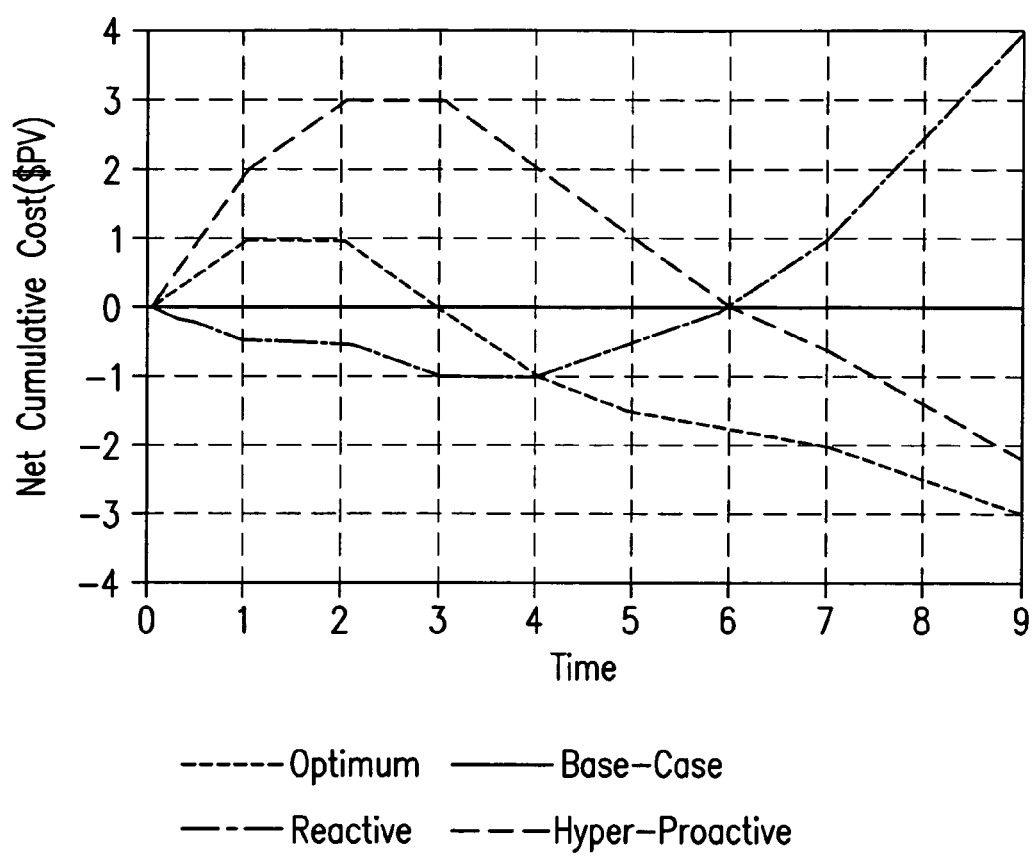
FIG. 6 is an illustration of asset management options utilizing various levels of proactivity.

Referring to FIG. 6, an optimum recommended management solution (line 2) provides the greatest return for economic expense. Line 1, as provided, is a base line case. Line 3 provides a hyper-proactive case of overly maintaining the steam generator asset by performing excessive maintenance procedures. Line 4 provides a case where no activities are performed.

As provided in FIG. 6, implementation of an optimal strategy for maintenance of the steam generator provides for optimal economic recovery of the steam generator asset.

What is claimed is:

1. A method to determine corrective actions of a steam generator of an operating nuclear power plant, comprising:
modeling heat transfer characteristics of deposits over the heating surface of a steam generator tubing by analytically deriving descriptive model parameters, the model parameters comprising the deposit thickness, $\delta$, the deposit porosity, $\epsilon$, the deposit copper content, Cu, the effective fraction, K, of the deposit full thickness conductive heat transfer resistance, which lies between the tubing and deposit steam channel, and the deposit tortuosity, $\tau$, wherein individual parameters $\delta$, $\epsilon$, Cu, K, and $\tau$ evolve in time as a function of a B parameter as follows:

$$\varepsilon = \varepsilon_0 e^{\left[\frac{-t}{B}\right]},$$

$$\tau = 1 + \tau_0 \left[1 - e^{\left[\frac{-t}{B}\right]}\right],$$

$$K = K_0 \left[1 - e^{\left[\frac{-t}{B}\right]}\right],$$

$$Cu = Cu_0 e^{\left[\frac{-t}{B}\right]}, \text{ and}$$

$$\delta = \frac{M_i}{(1 - \varepsilon)(SD)(A_T)},$$

wherein $M_i$ is the mass of deposit inventory, SD is the deposit solid density, $A_T$ is the tubing outside diameter surface area affected by deposit, t is the number of days since startup of the reactor or since the occurrence of a significant operational or maintenance event of the steam generator, B is a time constant describing parameter evolution, $\epsilon_0$ is the maximum possible porosity, $\tau_0$ is the maximum possible tortuosity, $K_0$ is the maximum possible resistance, and $Cu_0$ is the maximum possible copper content, and wherein the modeling comprises calculating the B parameter on the basis of either empirical deposit measurement data or historical thermodynamic data and deposit inventory mass data for the operating plant under evaluation;

identifying a set of preventative and/or corrective maintenance alternatives for the steam generator to accomplish steam generator deposit objectives, based on the modeling;

determining through the modeling a power production impact of the set of preventative and/or corrective maintenance alternatives for the steam generator; and initiating a maintenance alternative on the steam generator, based on the determination of the power production impact of the set of preventative and/or corrective maintenance alternatives for the steam generator.

2. The method according to claim 1, further comprising determining an economic cost for the set of preventative and/or corrective maintenance alternatives for the steam generator based on the power production impact of the set of preventative and/or corrective maintenance alternatives for the steam generator wherein the maintenance alternative initiated on the steam generator has an economic cost less than the economic costs of the other identified maintenance alternatives.

3. The method according to claim 1, wherein the historical thermodynamic data is steam pressure in the steam generator under operating conditions, primary side hot and cold leg temperatures, in-service heat transfer tube surface area, and steam generator thermal power.

4. The method according to claim 1, wherein the empirical deposit measurement data are obtained through removal and testing of deposits from the steam generator tubing.

5. The method according to claim 4, wherein the deposit removal is accomplished through scraping and/or lancing the heating surface of the steam generator tubing.

6. The method according to claim 4, wherein the testing comprises determination of one or more of the deposit thickness $\delta$, the deposit porosity $\epsilon$, the deposit copper content Cu, the effective fraction K of the deposit full thickness conductive heat transfer resistance, which lies between the tubing and deposit steam channel, and the deposit tortuosity $\tau$.

7. The method according to any claim 4, wherein a chemical analysis of the flakes obtained from the steam generator tubing is accomplished to determine the deposit thermal resistance.

8. The method according to claim 2, wherein the step of determining an economic cost for the set of preventative and/or corrective maintenance alternatives comprises recalculating periodically the modeled deposit thermal resistance to account for planned maintenance activities or unanticipated changes in the plant operating behavior.

9. The method according to claim 1, wherein the maintenance alternatives comprise actions selected from the group consisting of chemical cleaning, upper bundle flush, enhanced upper bundle flush, and sludge lancing.

10. A method of maintaining a steam generator, the method comprising:

obtaining historic and/or current data for at least one of a steam generator deposit porosity, $\epsilon$, steam channel tortuosity, $\tau$, deposit thermal resistance, K, deposit copper content, Cu, and deposit thickness, $\delta$, for a steam generator or a steam generator of the same design;

calculating a B-base fouling factor, B, from the historic and/or current data and at least one of:

$$\varepsilon = \varepsilon_0 e^{\left[\frac{-t}{B}\right]},$$

$$\tau = 1 + \tau_0\left[1 - e^{\left[\frac{-t}{B}\right]}\right],$$

$$K = K_0\left[1 - e^{\left[\frac{-t}{B}\right]}\right],$$

$$Cu = Cu_0 e^{\left[\frac{-t}{B}\right]}, \text{ and}$$

$$\delta = \frac{M_i}{(1-\varepsilon)(SD)(A_T)}, \text{ wherein}$$

$M_i$ is the deposit inventory mass, SD is the deposit solid density, $A_T$ is a tube bundle outside diameter surface area affected by deposition, t is the number of days since startup of the reactor or since the occurrence of a significant operational or maintenance event of the steam generator, B is a time constant describing parameter evolution, $\epsilon_0$ is the maximum possible porosity, $\tau_0$ is the maximum possible tortuosity, $K_0$ is the maximum possible resistance, $Cu_0$ is the maximum possible copper content, and $\epsilon_0$, $\tau_0$, $K_0$, and $Cu_0$ are determined from available deposit data or design data for the steam generator;

calculating the future evolution in time of at least one of the deposit porosity, steam channel tortuosity, deposit thermal resistance, deposit copper content, and deposit thickness using the calculated B-base fouling factor;

determining available maintenance alternatives for the steam generator for remediation of the evolution in time of at least one of the deposit porosity, steam channel tortuosity, deposit thermal resistance, deposit copper content, and deposit thickness; and performing at least one of the maintenance alternatives on the steam generator.

11. The method according to claim 10, wherein the maintenance alternative performed on the steam generator is selected from the group consisting of operating the steam generator for a time, t, before performing maintenance, operating the steam generator at reduced power, chemical cleaning, upper bundle flush, enhanced upper bundle flush, sludge lancing, and combinations thereof.

12. The method according to claim 10, further comprising predicting future power production levels using the calculated future evolution in time of at least one of the deposit porosity, steam channel tortuosity, deposit thermal resistance, deposit copper content, and deposit thickness.

13. The method according to claim 12, further comprising determining costs for replacement power.

14. The method according to claim 10, wherein the historic data comprises at least one of steam pressure in the nuclear steam generator under operating conditions, primary system hot and cold leg temperatures, in-service heat transfer tube surface area, and steam generator thermal power.

15. The method according to claim 10, further comprising obtaining and testing a deposit.

16. The method according to claim 15, further comprising determining one or more of the deposit thermal resistance, deposit thickness, deposit porosity, and tortuosity of a steam channel in the deposit layer.

17. The method according to claim 15, wherein the deposit is obtained by scraping and/or lancing a heating surface of steam generator tubing.

18. The method according to claim 15, wherein the B-base fouling factor is calculated from measurements taken from the deposit.

19. The method according to claim 10, further comprising determining remaining licensing life of the generator and/or generator changes from maintenance outages/modifications that affect corrosion susceptibility.

20. The method according to claim 1, wherein the modeling is performed on a computer.

21. The method according to claim 2, wherein the economic cost determination is based upon one of the net present worth, internal rate of return, and a payback period, and, optionally, is further based upon the cost of replacement power.

22. The method according to claim 10, wherein the calculations are performed on a computer.

23. The method according to claim 10, further comprising determining the maintenance alternative having the least economic cost; and performing the maintenance alternative having the least economic cost on the steam generator.

24. The method according to claim 23, wherein determining the economic cost comprises determining at least one of the net present worth, internal rate of return, and a payback period, and, optionally, further comprises determining the cost of replacement power.

* * * * *

UNITED STATES PATENT AND TRADEMARK OFFICE
CERTIFICATE OF CORRECTION

PATENT NO. : 7,637,653 B2  Page 1 of 1
APPLICATION NO. : 11/472651
DATED : December 29, 2009
INVENTOR(S) : Pop et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 292 days.

Signed and Sealed this

Ninth Day of November, 2010

David J. Kappos
*Director of the United States Patent and Trademark Office*